March 21, 1967 F. DOSTAL 3,310,757

DECOUPLING MOUNTING PLATES FOR TUNING FORK OSCILLATORS

Filed Sept. 15, 1966 2 Sheets-Sheet 1

INVENTOR.
Frank Dostal

BY [signature]

ATTORNEY

DECOUPLING MOUNTING PLATES FOR TUNING FORK OSCILLATORS
Filed Sept. 15. 1966 
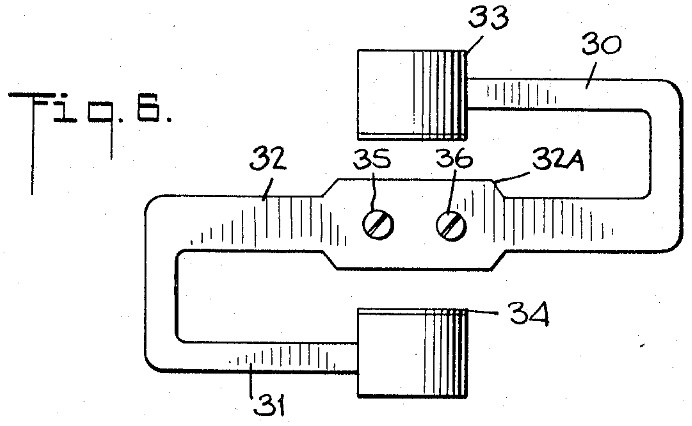
Fig. 6.
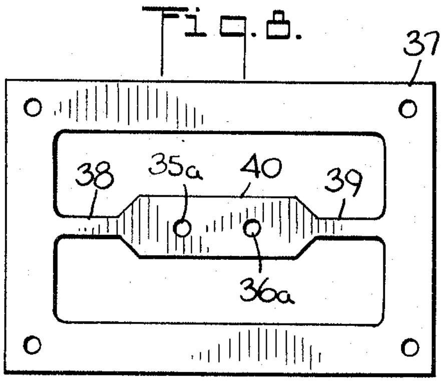
Fig. 8.
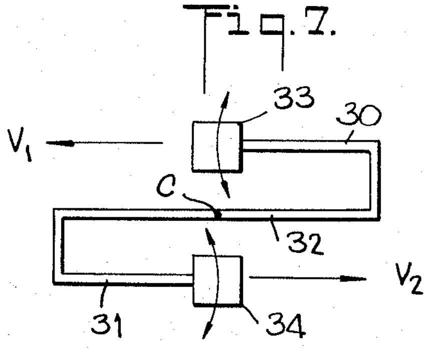
Fig. 7.
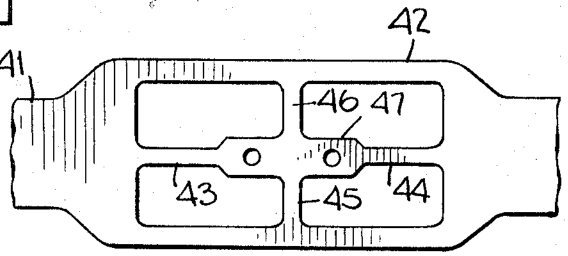
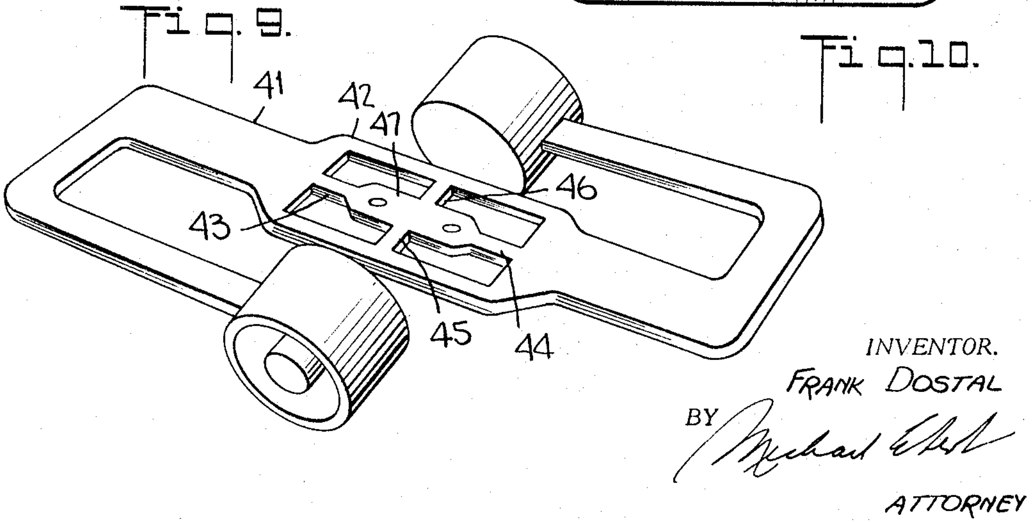
Fig. 9. Fig. 10.
INVENTOR.
FRANK DOSTAL
BY [signature]
ATTORNEY

United States Patent Office 3,310,757
Patented Mar. 21, 1967

3,310,757
DECOUPLING MOUNTING PLATES FOR TUNING FORK OSCILLATORS

Frank Dostal, Elmhurst, N.Y., assignor to Bulova Watch Company, Inc., New York, N.Y., a corporation of New York Filed Sept. 15, 1966, Ser. No. 579,792
6 Claims. (Cl. 331—116)

This invention relates generally to tuning-fork oscillators, and more particularly to an improved mounting plate for a tuning fork having a Z configuration which plate has a compliance characteristic effectively isolating the fork from the mounting plate with respect to the vibratory forces, whereby the fork frequency is precisely maintained. This application discloses improvements over the invention disclosed in my copending application S.N. 509,510 filed Nov. 24, 1965.

Tuning-fork oscillators have many practical applications, and are currently used as frequency standards, for power-line regulation, in guidance systems and geophysical instruments, as tuned filters, and as driving elements for optical modulators and in timing devices. The operating frequency of a vibratory fork is determined by the tine dimensions, the frequency being directly proportional to the thickness of the tines and inversely proportional to the square of their length.

The utility of a tuning-fork oscillator depends on its frequency stability, and it is essential therefore, that the fork operate at a constant frequency even when the fork is employed in an environment which subjects the fork to external shocks such as in a jet plane, a tank, a destroyer, or other moving vehicle. The utility of a tuning-fork oscillator also depends on its operating frequency, and there is a growing need for forks operating in the high-frequency range, that is, in the range of 3000 cycles per second and upwards.

A tuning-fork oscillator is a system constituted by three masses which are elastically coupled, the first two masses being the tines and the third being the mounting fixture for the fork. In order for the fork to operate at a predetermined frequency, the masses and elasticities must remain constant. There is a tendency, however, particularly in high-frequency forks, for spurious oscillations to be excited in the mounting plate, as a consequence of which the work operation, frequency and stability are adversely affected.

Thus the fork system is effectively altered from a normal system constituted by three masses and two elasticities, to an abnormal system having an additional elasticity by reason of mounting plate elasticity. The third mass and third elasticity are therefore a source of difficulty, for they contribute unknown components to the basic frequency-determined masses and elasticities.

The tines of a tuning fork having a U shaped configuration vibrate in phase opposition at a frequency determined by the parameters of the system. The ends of the tines execute an arcuate motion in the course of vibration, the motion producing a secondary component of motion which is developed in a direction along the axis of the fork and at a freqeuncy twice that of the tines. The reason for this is that the arcuate motion of the tines includes an axial vector, and inasmuch as each tine traverses its zero position twice in the course of a vibratory cycle, the axial frequency is double the tine frequency.

In a conventional mounting arrangement wherein the fork is rigidly mounted, the axial component is transmitted to the mounting plate, as a result of which the plate is excited, the stability is disturbed, and the Q is reduced. The excitation of the plate by other components of fork vibration can be nulled out by carefully balancing the tines of the fork, but even when the tines are balanced, the axial component will be transmitted to the mounting plate.

It is known to provide tuning forks having a U shaped configuration with mounting stems resiliently joined to the base of the fork or to provide resilient supports for the fork, but while such expedients are effective to decouple the fork from the mounting with respect to transversely-directed components of fork motion, they are ineffective as to the axial component.

With a tuning fork having a Z shaped configuration, such as that disclosed in Patent 3,192,701, the ends of the tines execute an arcuate motion in the course of vibration, this motion producing a secondary component of motion which is developed in a direction along the axis of each tine at a frequency twice that of the tines. But whereas in a U shaped fork the secondary components of motion of the two tines are vectors in the same direction, in the case of a Z shaped fork, these components are vectors in opposing directions, as a consequence of which a torque is produced. If the Z shaped fork is rigidly mounted as in said prior patent, the torque will be transmitted thereto, thereby exciting the mounting plate and disturbing the stability of the work and reducing Q.

Accordingly, it is the main object of the invention to provide a mounting plate for a tuning fork, the plate having a compliance characteristic which permits the fork to vibrate or oscillate in response to secondary components of motion produced by the tines, but which at the same time acts to effect optimum decoupling of the mounting plate and the fork with respect to fork vibrations or oscillations. Thus the mounting plate in accordance with the invention serves to isolate the third mass and third elasticity to maintain the desired operation, frequency and stability of the fork.

More specifically, it is an object of the invention to provide a mounting plate for a tuning fork having a U shaped configuration, the plate having a compliance characteristic which permits the fork to vibrate axially, but which at the same time acts to effect optimum decoupling of the mounting and the fork with respect to the axial component. Also an object of the invention is to provide a mounting plate for a Z shaped tuning fork, the plate having a compliance characteristic which permits the body of the fork to oscillate, but which at the same time, acts to decouple the mounting and the fork with respect to such oscillation.

A significant feature of the invention is that it is specially effective in preventing the excitation of spurious vibrations in a mounting plate when the fork operates in the high-frequency region. An advantage of this feature is that it now becomes possible to make precision frequency forks in a range going as high as 25 kilocycles per second, whereas it was heretofore difficult or impossible to make precision forks with frequencies as high as 3 kilocycles.

Briefly stated, these objects are attained in a mounting plate having an aperture which is bridged by bendable beams, the beams supporting a platform on which is mounted the tuning fork in a manner whereby the tines of the fork lie in a plane parallel to the plane of the mounting plate.

The mass of the fork and the elasticity of the compliance provided by the bendable beams are such as to establish a frequency which is less than twice the fork frequency, whereby the fork is effectively decoupled from the mounting with respect to the spurious component of vibration or oscillation.

For a better understanding of the invention, as well as other objects and further features thereof, reference is made to the following detailed description to be read in conjunction with the accompanying drawing, wherein.

Figure 1:
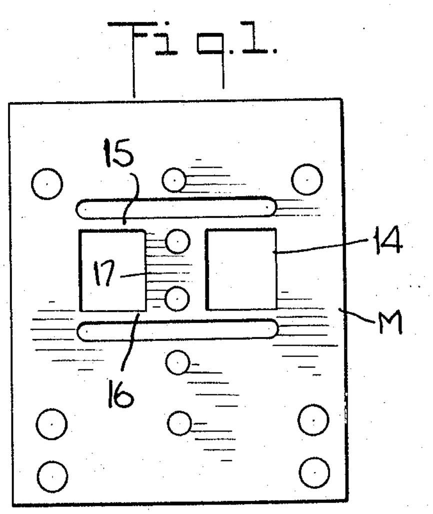
FIG. 1 is a plan view of a compliant mounting plate in accordance with the invention for a U shaped fork.
Figure 2:
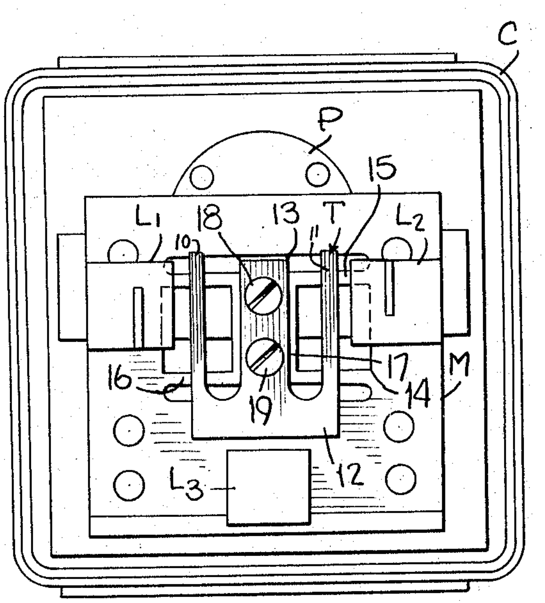
FIG. 2 shows a plug-in type of U shaped tuning-fork oscillator, in plan view, with a tuning fork supported on the mounting plate.
Figure 3:
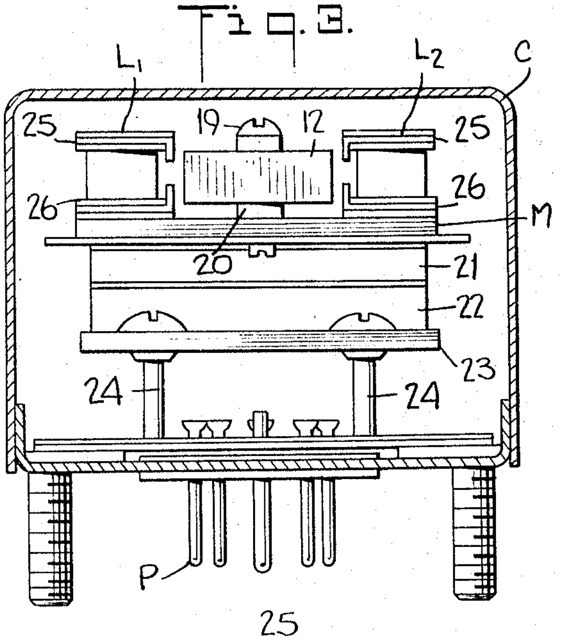
FIG. 3 is an end view of the oscillator.
Figure 5:
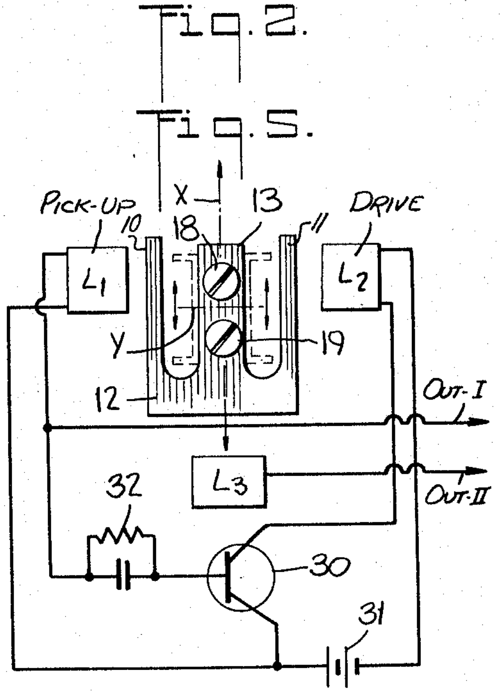

FIG. 5 schematically shows the oscillator circuit;

FIG. 6 is a plan view of a Z shaped tuning fork;

FIG. 7 schematically illustrates how spurious components are developed in a Z shaped fork;

FIG. 8 is a plan view of a compliant mounting plate for a Z shaped fork;

FIG. 9 is a Z shaped fork, in perspective view, in which the compliant mounting plate is integral with the fork structure; and FIG. 10 is a plan view of the fork shown in FIG. 9.

*Mounting for U shaped fork*

Referring now to the drawing, there is shown a tuning-fork oscillator in accordance with the invention, the oscillator including a U shaped tuning fork, generally designated by letter T, a mounting plate M therefore, a pick-up coil $L_1$, a drive coil $L_2$, and an output coil $L_3$. The above-listed components are protectively housed as an assembly within a casing C provided with a multi-terminal plug P adapted to provide a plug-in connection for the coils to their associated electronic elements.

In the practical embodiment shown, the tuning fork was designed to operate at a fundamental mode of 9400 cycles per second, this frequency being determined by the dimensions of tines 10 and 11. As pointed out previously, the present invention makes it possible to provide precision tuning-fork oscillators operating at frequencies as high as 25,000 cycles. To minimize the effect of temperature on frequency, the fork is preferably made of such ferromagnetic alloys as "Ni-Span C" and "Vibralloy," to produce low-temperature coefficients. Alternatively, one may use a bi-metallic fork composed of laminae having a positive and negative coefficient.

The tines 10 and 11 of the U shaped fork project upwardly from a base 12 provided with an internal mounting stud 13 extending midway between the tines. The internal mounting stud serves to mount the fork at its center of moment, thereby considerably reducing the effects of shock and vibration thereon, as well as shortening the over-all length of the fork, as compared to an external mounting stud.

The mounting plate M, which may be formed of aluminum, is rectangular in form, and includes a generally rectangular central aperture 14 which is bridged by two bendable beams 15 and 16 disposed in parallel relation, the beams being interconnected by a transverse platform 17. In practice, the beams and platform may be integral members formed by cutting suitable slots in a solid plate to define these elements.

The tuning fork is mounted on the plate by two screws 18 and 19 which join the stud 13 to platform 17, a spacer 20 being interposed between the stud and the platform whereby the tuning fork is disposed in a plane parallel to the plane of the mounting plate, and the tines of the fork are normal to the longitudinal axes of beams 15 and 16.

Mounting plate M is supported on isolation blocks 21 and 22 carried on a base plate 23 resting within the casing C on pillars 24. The blocks are of a material having high flexibility and mechanical damping properties, such as foamed polyurethane.

Figure 4:
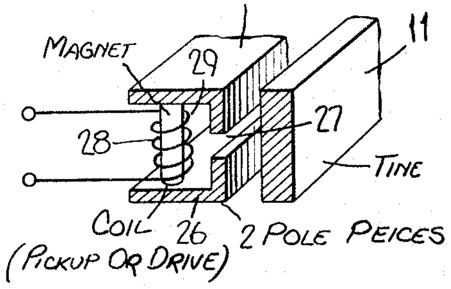
FIG. 4 illustrates in perspective a detail of the drive coil of the oscillator.

Characteristic coil $L_2$, as best seen in FIG. 4, is an electromagnetic element constituted by two L-shaped pole-pieces 25 and 26 forming an air gap 27, the pole-pieces being fabricated of soft iron or Permalloy, and being joined together by a permanent magnet member 28 surrounded by a winding 29. The air gap 27 is positioned adjacent tine 11, whereby when the coil $L_2$ is energized by a pulse of current, the resultant magnetic field acts on the tine to excite vibration therein. Pickup coil $L_1$ is identical in design to coil $L_2$, such that when tine 11 vibrates, it induces a voltage in the coil. Coil $L_3$ is also of the same design, but it is disposed adjacent the base of the fork, for reasons to be later explained.

As shown in FIG. 5, drive coil $L_2$ is connected in the emitter-collector circuit of a transistor 30 in series with battery 31, the pickup coil $L_1$ being connected in the base-emitter circuit through a resistance-capacitance biasing net-work 32 to a transistor amplifier having a gain in the order of a few hundred tines. The arrangement is such that the transistor is normally biased to cut-off, but is rendered momentarily conductive by a voltage induced in pickup coil $L_1$, by the vibration of tine 11. When the transistor is conductive, a current impulse passes through the drive coil $L_2$, which actuates tine 10, this process being repeated cyclically to maintain the fork in vibration. Thus curents induced in pickup coil $L_1$ due to one tine motion are amplified and applied to drive coil $L_2$, thus maintaining the fork in vibration.

The transistor drive arrangement for the fork forms no part of the present invention, and the fork may also be maintained in operation by vacuum-tube circuits or other means conventionally used for driving a tuning fork.

When the tines 10 and 11 of the fork vibrate along an arcuate path, an axial component of motion is produced which is transmitted toward the base 12 along the axis extending along stud 13 and represented by line X in FIG. 5. In the event the mounting of the fork were rigid, this axial motion would in turn be transmitted to the mounting plate, with the adverse effect previously noted. However, the fork is supported on beams 15 and 16, which impart axial compliance to the mounting along axis X. The degree of compliance provided by the elasticity of the beams is made such with respect to the mass of the fork supported thereon as the establish a freqeuency which is less than twice the fundamental frequency of the fork. Hence, the frequency of the compliant mounting is non-resonant with respect to that of the fork, and the fork and the mounting are effectively decoupled in regard to the axial component of fork motion. Because of the difference in the frequency of the fork and the frequency characteristic of the mounting, the vibration of the fork in the axial direction does not act to produce parasitic oscillations in the mounting.

The compliant mounting is also capable of rotation about the point of intersection between an axis Y perpendicular to the X-axis and midway between beams 15 and 16, so as to decouple the fork from the mounting with respect to non-axial components of fork motion which are not otherwise completely balanced out.

Thus the efficiency of the fork is maintained at its optimum value and its stablility is not adversely affected by the mounting therefor, nor by external shocks, for the fork is also isolated from such shock. While it is sufficient that the resonance of the compliant mounting, with the fork in place, be under twice the fork frequency, the stiffness must be maintained sufficiently high so that external vibrations, such as that produced by jet aircraft, induced along the tine axis do not themselves excite resonance.

It will be noted that the oscillator has two outputs, the first of which OUT–I is derived from pickup coil $L_1$ and has a stable frequency determined by the tine frequency, and the second of which OUT–II is derived from coil $L_3$ and is twice the tine frequency. As pointed out previously, the base of the fork has a vibratory component transmitted thereto which is double the tine frequency and it is this harmonic component which is picked up by coil $L_3$.

*Z-shaped fork mounting*

Referring now to FIG. 6, there is shown a Z-shaped fork constituted by tines 30 and 31 joined to the ends of a base 32 and extending therefrom in opposing directions at equal distances from the central axis of the base, whereby the fork configuration assumes that of the letter Z. The tines are shaped and dimensioned to have substantially equal natural frequencies. Attached to the free ends of the tines 30 and 31 are magnetic elements 33 and 34 which form part of the electromagnetic transducers for actuating the tuning fork in the manner disclosed in Patent 3,192,701 and in Hetzel Patent 2,908,174, among others.

In operation, tines 30 and 31 reciprocate in opposing directions, the back-and-forth movement of the tines being converted to rotary motion for driving a clockworks or for other purposes requiring a constant speed of rotation. In a timepiece employing a U-shaped tuning fork, the timing of the mechanism depends on the position of the tines with reference to the force of gravity, and a small-fraction error is encountered if the timepiece position is occasionally changed in the course of operation. But with a Z-shaped fork, because of the 180 degree inverted symmetry of the two tines, the position error produced in one tine is effectively cancelled out by the reverse error produced in the other.

In the timepiece shown in Patent 3,192,701, the Z-shaped fork is rigidly secured on a mounting surface by means of screws 35 and 36 or similar means passing through bores in the central portion 32A of the base of the fork. As will now be shown, when the fork is so mounted, a torque which is developed by the fork is transmitted to the mounting surface. As a consequence, the mounting absorbs energy and is exicted thereby, and the stability of the fork is disturbed.

As illustrated in simplified form in FIG. 7, tines 30 and 31 undergo an arcuate motion 180 degrees out of phase, as indicated by the curved arrows. The vectors $V_1$ and $V_2$, due to this arcuate motion, extend along lines coinciding with the axes of the tines, and since the tines in the Z-shaped fork are opposed, the vectors extend in opposite directions. The vectors $V_1$ and $V_2$ therefore tend to produce a torque about the point C at the center of base 32, this twisting action reversing each time the vectors reverse direction. The torque acting on point C produces an oscillation at a frequency which is twice the natural frequency of the tines, for each tine traverses its zero position twice in the course of a vibratory cycle.

To minimize the effect of this secondary torsional motion on fork frequency, the fork is mounted on a plate 37, as shown in FIG. 8, whose central area is cut out to define two bendable ribs or beams 38 and 39 which are aligned and lie in parallel relation with the sides of the plate, the beams joining a central platform 40 for supporting the tuning fork. Thus the screws 35 and 36, instead of securing the fork to a rigid mounting, are received in bores **35*a* and 36*a* on platform 40. Spacer elements, not shown, are interposed between the fork and mounting plate on screws 35 and 36**, whereby the fork is spaced from the mounting plate in a plane parallel thereto, and the tines are free to vibrate.

Ribs 38 and 39 provide the necessary compliance to permit the fork to execute the secondary torsional motion. However, the degree of compliance provided by the elasticity of the ribs is made such with respect to the mass of the fork supported thereon, as to establish a frequency which is less than twice the fundamental frequency of the fork. Hence the frequency of the compliant mounting is non-resonant with respect to that of the fork, and the fork and mounting are effectively decoupled in regard to the torsional component of fork motion.

In the arrangement shown in FIGS. 9 and 10, the Z-shaped tuning fork includes a base 41 having a compliant mounting integral therewith, thereby doing away with the need for a separate mounting plate. To this end, the central area 42 of the base is cut out to define radial ribs 43, 44, 45 and 46 joined to a platform 47 in a spider-like structure. By rigidly securing platform 47 to a mounting surface, the Z-fork is compliantly mounted by reason of the bendable ribs 43, 44, 45 and 46, to obtain the advantages noted above.

It is also possible with a compliant mounting of the type disclosed in FIGS. 9 and 10 to further obtain for the Z fork the advantages realized by Van Haaften in his Patent 3,162,006 for a U shaped fork. In the Van Haaften patent, the stem which connects the base of the fork to a mounting plate is constricted at the junction of the stem and the base to provide, in effect, a flat spring producing lateral compliance.

A similar advantage may be obtained in connection with the Z fork mounting structures shown in FIGS. 9 and 10 by omitting bendable ribs 45 and 46, whereby the fork is supported only by ribs 43 and 44 which lie on a common straight line thereby providing lateral as well as torsional compliance, and effectively enhancing the coupling between the tines of the fork. Alternatively, to obtain the same advantages, one may omit rib 43 as well as ribs 45 and 46, whereby the fork is then supported only by rib 44.

While there have been shown and described preferred embodiments of mounting plate for tuning fork in accordance with the invention, it will be appreciated that many changes and modifications may be made therein without, however, departing from the essential spirit of the invention as defined in the annexed claims.

What I claim is:

1. A precision oscillator comprising:

(a) a tuning-fork having a Z-shaped configuration defining a pair of tines interconnected by a base, (b) means actuating said tines periodically to maintain said fork in oscillation at its natural frequency, said fork producing a torque about a central point in said base, (c) and a mounting for said fork, said mounting having a platform rigidly connected to the base of said fork, said platform being suspended within an opening in said mounting by at least one bendable element imparting a compliance to said mounting having a value of elasticity which in combination with the mass of the fork establishes a frequency which is lower than the natural frequency of the fork.

2. An oscillator as set forth in claim 1, wherein said means to sustain said fork in vibration includes a fixed drive coil operatively coupled to one of said tines, a fixed pickup coil operatively coupled to the other of said tines, and a transistor circuit whose input is coupled to the pickup coil and whose output is coupled to the drive coil to apply pulses thereto under the control of voltages induced in said pickup coil.

3. A precision tuning-fork oscillator comprising:

(a) a Z-shaped tuning fork having a pair of tines extending from a base, said fork when actuated producing a torque about a central point in said base, and (b) a mounting plate for said fork which includes at least one bendable beam supporting a platform within a central aperture in said plate, said base being attached to said platform to support said fork in a plane parallel to said plate, the compliance afforded by said beam having an elasticity which in combination with the mass of the fork establishes a frequency lower than the natural frequency of the fork.

4. An oscillator as set forth in claim 3 wherein said platform is supported within said aperture by a pair of aligned bendable beams connected to either side of said platform.

5. An oscillator as set forth in claim 4 further including a second pair of aligned bendable beams at right angle to said first pair to support said platform.

6. An oscillator as set forth in claim 3 wherein said base of said fork is cut to define said mounting plate as an integral part thereof.

No references cited.

ROY LAKE, *Primary Examiner*.

J. KOMINSKI, *Assistant Examiner*.